Figure 1:
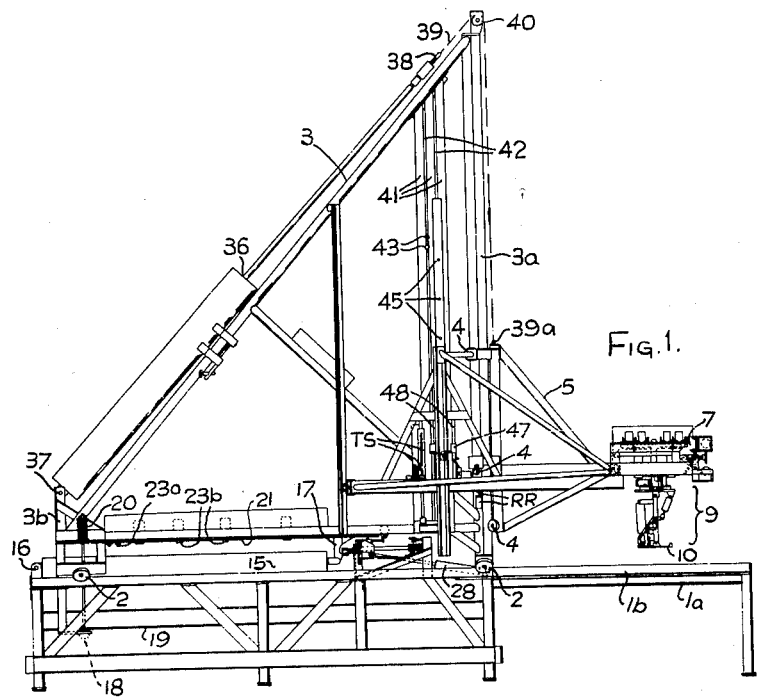

July 26, 1966  A. C. TEAGO  3,262,594

MECHANICAL HANDLING APPARATUS

Filed April 18, 1961  8 Sheets-Sheet 1

INVENTOR
ANTONY CHARLES TEAGO
BY Dike, Craig & Freudenberg
ATTORNEYS

July 26, 1966  A. C. TEAGO  3,262,594
MECHANICAL HANDLING APPARATUS
Filed April 18, 1961  8 Sheets-Sheet 6

INVENTOR
ANTONY CHARLES TEAGO
BY Lieke, Craig & Freudenberg
ATTORNEYS

July 26, 1966    A. C. TEAGO    3,262,594
MECHANICAL HANDLING APPARATUS
Filed April 18, 1961    8 Sheets-Sheet 7

INVENTOR
ANTONY CHARLES TEAGO
BY Dike, Craig & Freudenberg
ATTORNEYS

July 26, 1966     A. C. TEAGO     3,262,594

MECHANICAL HANDLING APPARATUS

Filed April 18, 1961     8 Sheets-Sheet 8

INVENTOR
ANTONY CHARLES TEAGO
BY Lucke, Craig & Freudenberg
ATTORNEYS

United States Patent Office 3,262,594
Patented July 26, 1966

3,262,594
MECHANICAL HANDLING APPARATUS
Antony Charles Teago, Ifield, Crawley, Sussex, England, assignor to Woodfield Bennett Ltd., Frindsbury Works, Rochester, Kent, England, a British company
Filed Apr. 18, 1961, Ser. No. 103,862
Claims priority, application Great Britain, June 8, 1960, 20,220/60; Feb. 1, 1961, 3,846/61
3 Claims. (Cl. 214—652)

This invention relates to mechanical handling apparatus.

The invention provides apparatus for mechanically handling articles, comprising a carrier for acquisition, conveyance, and release of a predetermined number of the articles, structural means with which the carrier is associated to be displaceable in a variety of different movements to limited extents, and means operably associated with the structural means for effecting said movements under control of an operations controller. Conveniently the structural means provides for movements of the carrier in at least three mutually transverse directions. Conveniently also the structural means provides for the movements of the carrier to include changes of disposition at times between the acquisition and release of the articles. The controller may conveniently provide for a succession of movements of the carrier to occur automatically either to carry out only one cycle of different movements or to carry out a cycle of movements repetitively. Conveniently the structural means provides for the movements of the carrier to include twisting, tilting and rotating. Conveniently there may also be provided in connection with the apparatus of the invention an operations programer for controlling predetermined movements of the carrier. This programer may provide for said predetermined movements to be variable to limited extents. There may be means for acquisition by the carrier of the maximum number of the articles for which the carrier is designed or for any selected number or arrangement thereof.

Conveniently the controller for the mechanical handling apparatus may include a system of electrical relays for controlling movements of the carrier and a programer having a punched hole strip type control.

Conveniently the acquisition and release of the articles by and from the carrier is effected by control of suction between the carrier and the articles.

Conveniently predetermined terminal movements of the carrier are controlled to occur at reduced speed.

Conveniently the extent of movement of predetermined movements is controlled by variably position solenoid operated stops under control of the programer.

The invention also provides apparatus as described above in which the articles are bricks and by which bricks can be formed into a variety of differently stacked packs in which bricks may be end to end, side by side, together and/or spaced, in superimposed rows mutually parallel and/or transverse or at desired inclinations, and with the bricks on end, or on their sides or faces and with desired faces opposed.

Figure 2:
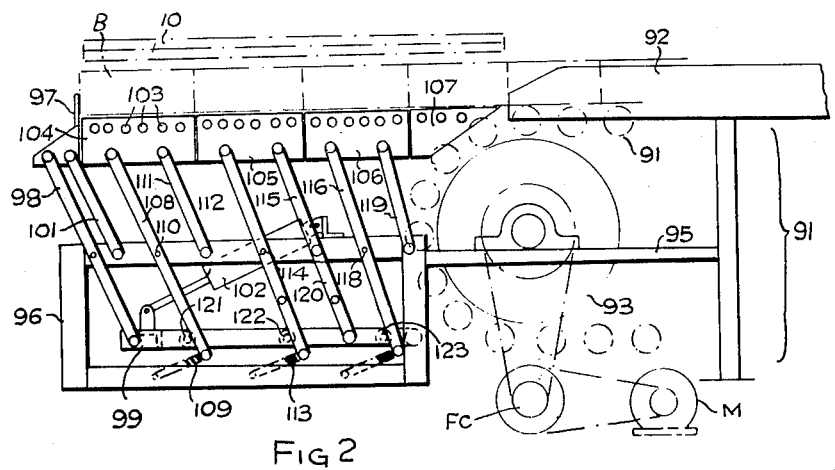
Figure 3:
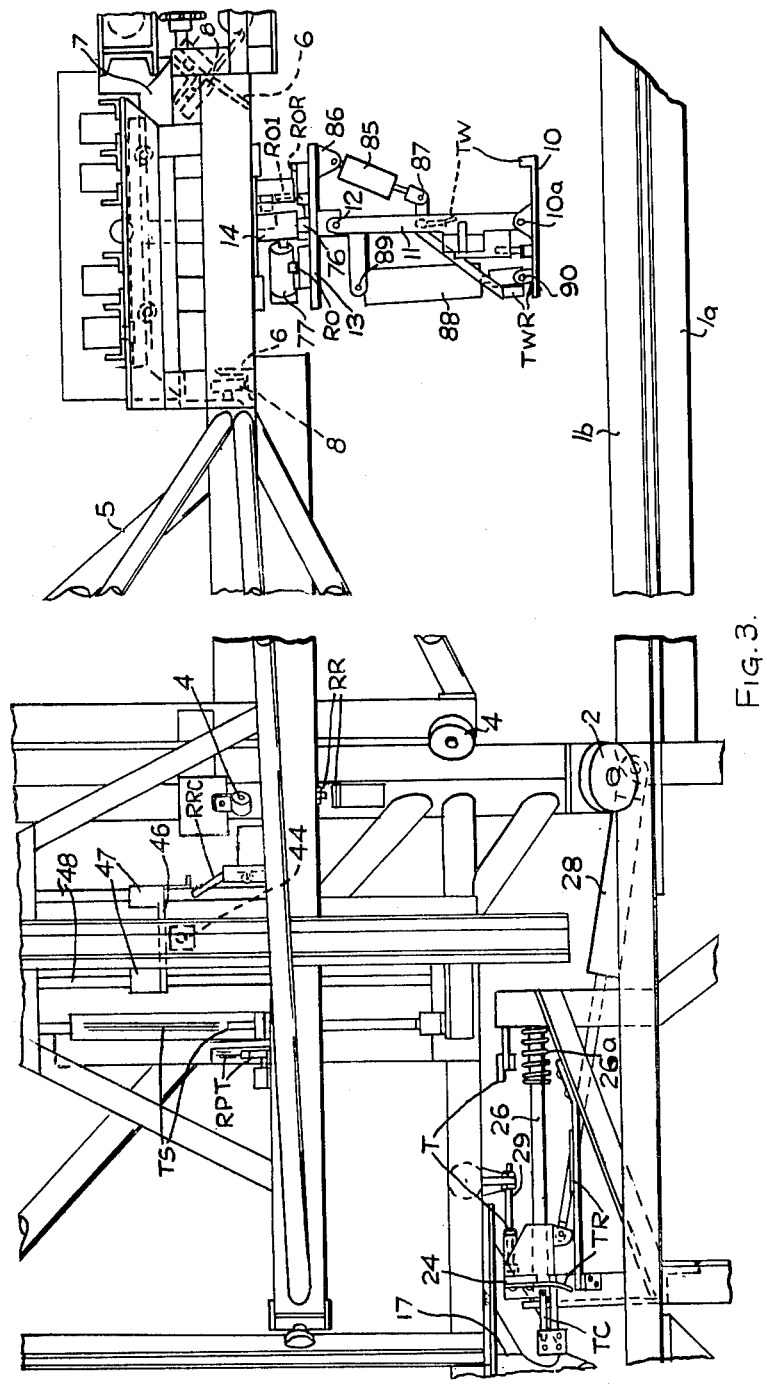
Figure 4:
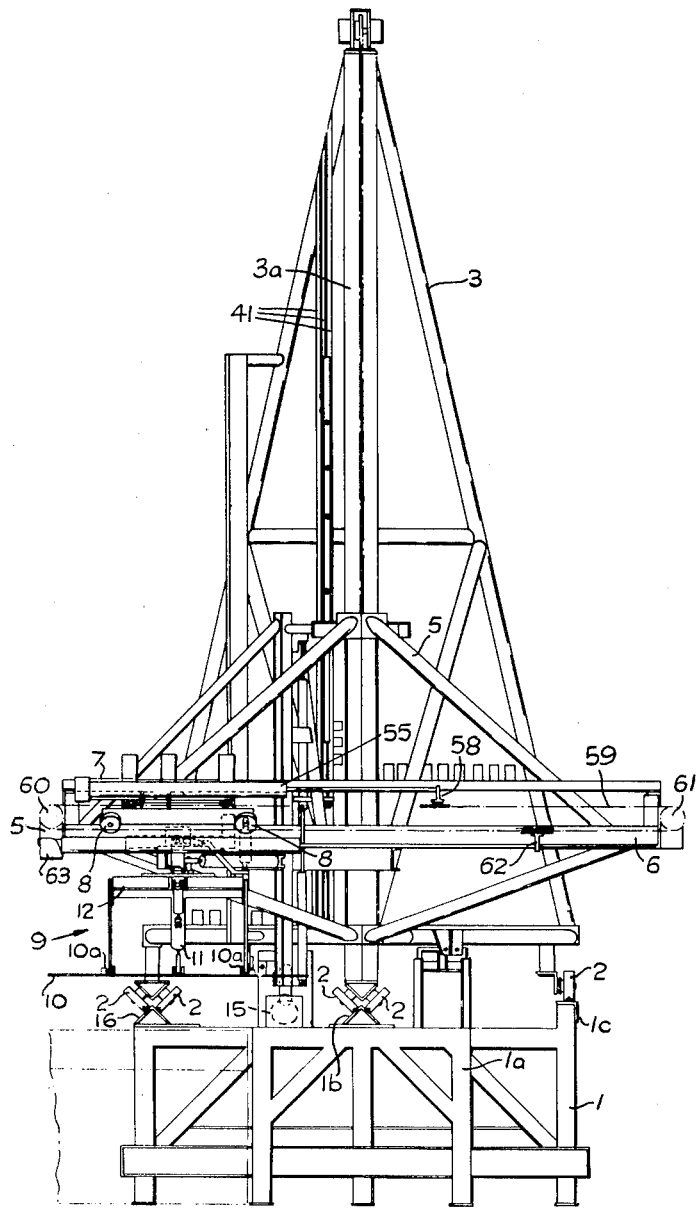
Figure 5:
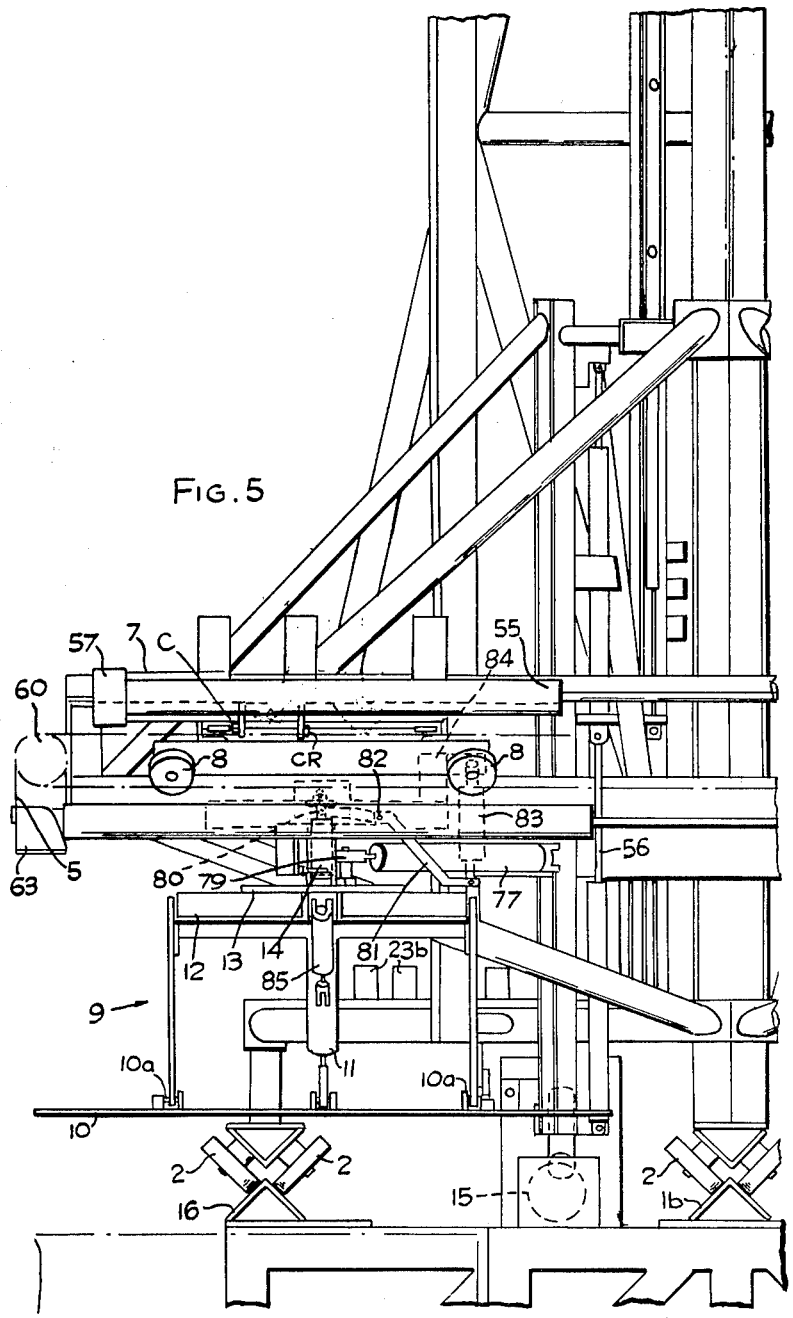
Figure 6:
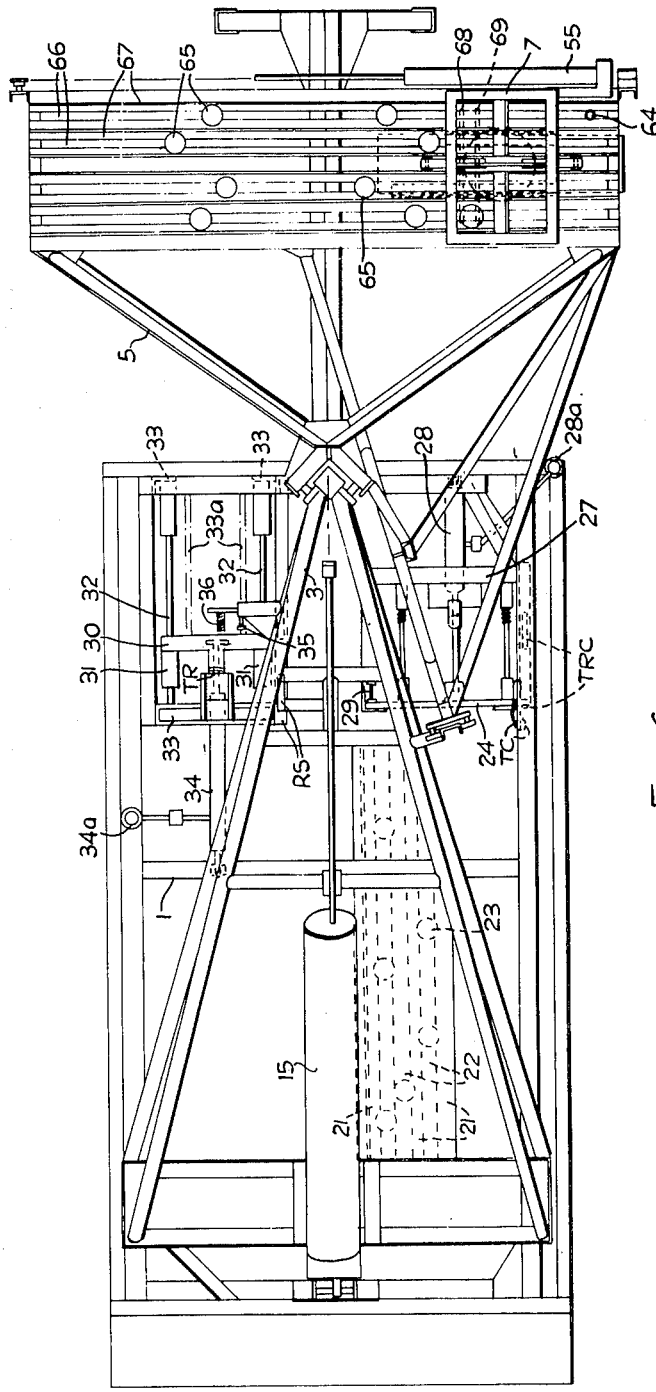
Figure 7:
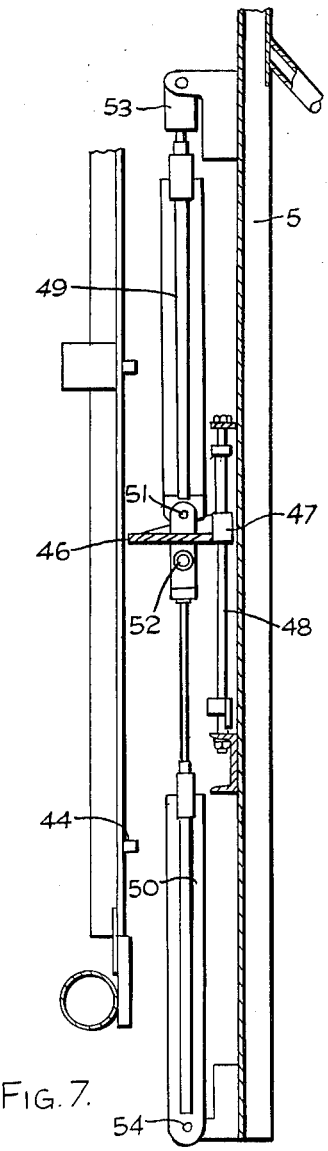
Figure 9:
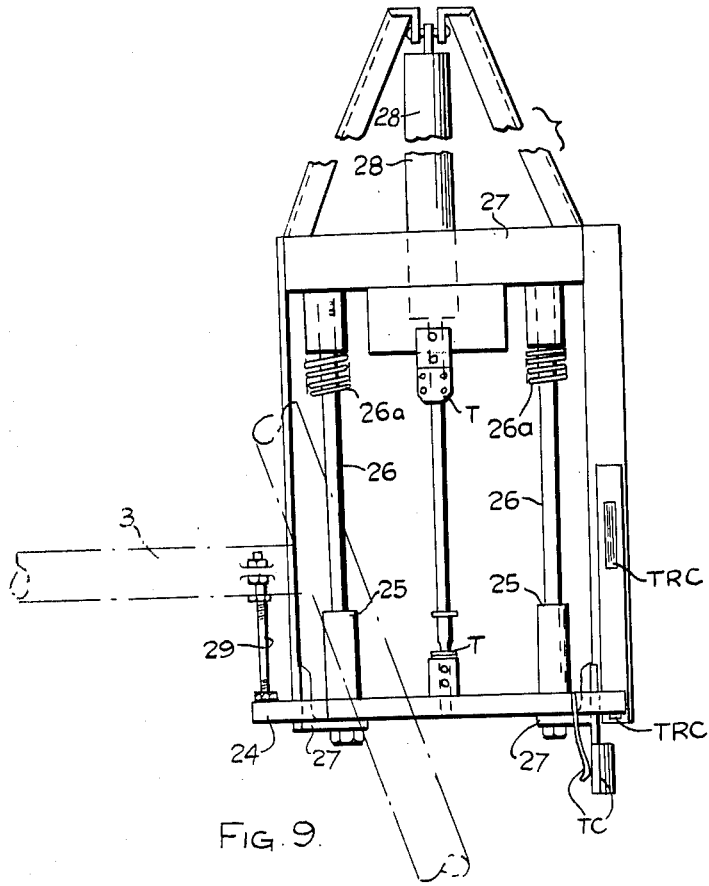
Figure 8:
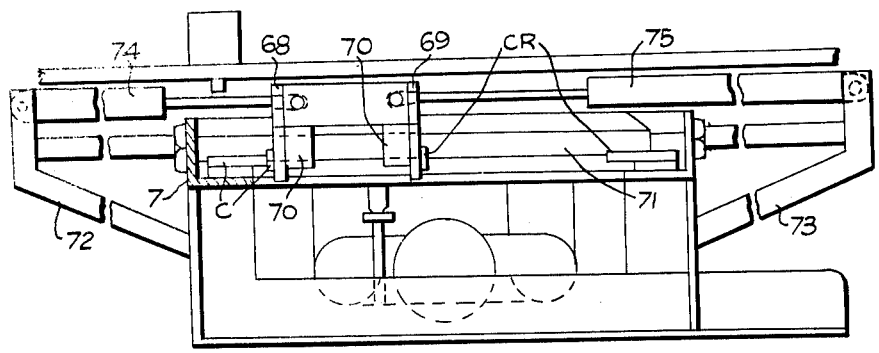
Figure 10:
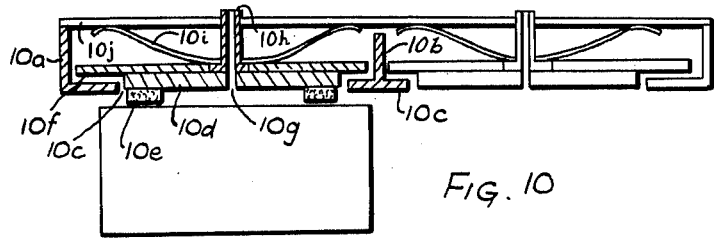
Figure 11:
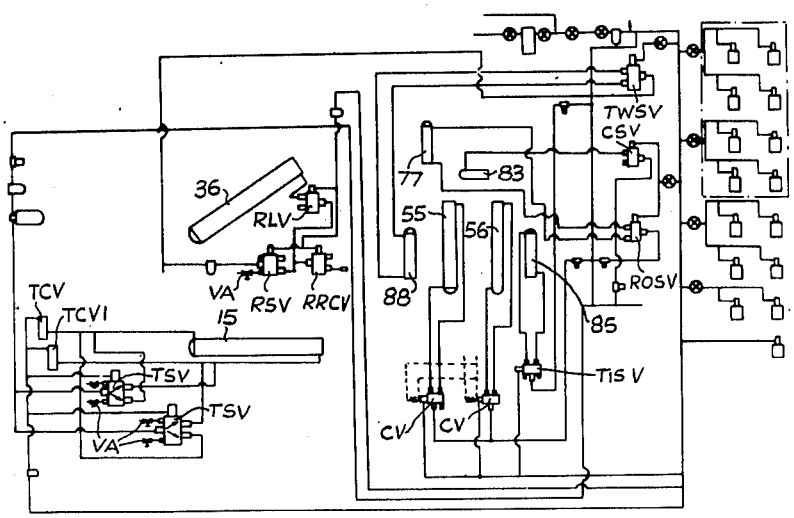

The above and other features of the invention set out in the appended claims are incorporated in the construction which will now be described, as a specific embodiment by way of example with reference to the accompanying drawings in which:

FIGURE 1 is a side elevation of a machine part of apparatus for mechanically handling bricks;
FIGURE 2 is an elevational detail of part of a conveyor for delivering bricks towards the machine;
FIGURE 3 is an enlarged view of part of FIGURE 1;
FIGURE 4 is an end view of said machine;
FIGURE 5 is an enlarged view of part of FIGURE 4;
FIGURE 6 is a plan view of said machine;
FIGURES 7, 8 and 9 are details of shock absorbing means used in the machine;
FIGURE 10 is a somewhat diagrammatic illustration of a carrier for the bricks used in the machine;
FIGURE 11 is a diagrammatic illustration of a pneumatic circuit for use with the machine.

The basic principles on which the apparatus works and the main sections thereof, will first be described broadly.

A conveyor is caused to convey bricks to a pick-up station adjacent a mechanical handling machine. The machine employs a suction carrier which by being guided by a suitable track and follower structure can be caused to pick up the bricks at the pick-up station and then to convey them to another location whereat they can be released from the carrier and deposited on a platform which may be for example that of a car or trolley.

For the purpose of picking up the bricks the carrier comprises a plate having a number of orifices disposed so that each lies over a brick at the pick-up station. The plate includes a plurality of suction pads, vacuum and pressure air being provided through pipe lines from any convenient source and controlled by solenoid valves.

The said track and follower structure provides for the carrier having a raise and return movement, a cross and return movement, and a travel and return movement. These movements are effected by actuators under control of electrical relays and switches.

The extent of the movements is under control of a number of solenoid stops which are selected for operation by a suitable programing arrangement (not shown).

The carrier may also have several other movements such for example as a twisting or tilting movement about a longitudinal axis, a rotational movement about a vertical axis, and a tilting movement about a horizontal axis. These movements are under control of electrical relays and switches, and the rotational and twisting movements may be under control of the programer.

From the foregoing it will be understood that there are five basic movements, raise, cross, travel, tilt and rotate, and the control thereof enables bricks to be picked up, conveyed, and deposited onto a platform for example such as of a car or trolley, in any predetermined fashion. The invention is by no means limited to the aforesaid five basic movements, for example the track and follower structure may provide for the carrier being moved for example in diagonal directions or at angles to the vertical.

By the use of this apparatus bricks, say in quantities of eight, can be picked up successively from the conveyor, conveyed to the platform, and there deposited in rows, with bricks end to end, side to side, spaced or otherwise, rows superimposed on rows, in parallel relationship or in transverse relationship or inclined relationship, in the formation of a pack built to any required height and shape.

In addition there may be means whereby the carrier can pick up either the maximum number of bricks for which it is designed, or any predetermined number thereof. This may be accomplished by the provision of a number of sections of the conveyor which are separately controlled with the aid of solenoids, the selection being effected from the programer. Alternatively it may be accomplished by controlling the vacuum feed to the carrier by the programer so that bricks under some of the orifices are not picked up.

Referring now to FIGURE 1 the mechanical handling machine comprises a base frame 1 having a forward extension 1a and inverted V-shaped guide rails, one shown at 1b in FIGURE 1 and two shown at 1b and 1c in FIGURE 4. These rails have mounted on them through the medium of rollers 2, a travel and return carriage 3 which carry the rollers 2. The frame 3 of the carriage is of substantially triangular configuration in a form to provide a forward upright guide rail 3a on which there is guided, by rollers 4, a raise carriage 5 carrying the rollers 4 and to which spaced horizontal rails 6 (FIG. 4) are fixed extending in a direction transverse to the rails 1b of the base frame 1.

Mounted on the raise carriage 5 there is a cross carriage 7 which has roller 8 riding on the rails 6 (see FIG. 4).

Depending from the cross carriage 7 there is a carrier structure 9 having at its lower end a head plate 10.

It will be seen that the head plate 10 is mounted on the structure described for movements upwardly and downwardly hereinafter referred to as raise and return, from side to side across the machine hereinafter referred to as cross and return, and forwardly and backwardly hereinafter referred to as travel and return.

In addition the head plate 10 which is of rectangular form is connected to the carrier structure 9 by a pivotal connection 10a (also FIGURE 3) midway of its width such that it can have a twist or tilt movement about its longitudinal horizontal axis, and further a frame part 11 to which the head plate 10 is pivotally connected, is itself connected by a pivotal connection 12 to a support plate 13 such that the head plate 10 can have a tilting movement about the horizontal pivot axis 12. Still further the plate 13 is in the nature of a turntable on a vertical bearing 14 such that the head plate 10 can have a rotational movement.

Dealing now with the travel and return, with reference to FIG. 1, this is effected by a pneumatic travel actuator indicated at 15 which is anchored by a pivotal connection 16 to the base frame 1 and is connected by a connection 17 to the travel carriage 3. In order to compensate for the overhanging weight at the front of the travel carriage 3, there is provided at the rear an additional roller 18 riding under a rail 19 and carried by a lower part 3b of the travel carriage 3 through the intermediary of a coil spring 20 to provide for a certain amount of resilience. For control of the extent of movement of the travel carriage 3 there is provided on it several rails 21, see particularly FIGURE 6, which are spaced to provide slots 22 in which there is secured a number of stops such as 23 of which those 23a shown at the rear of the machine in FIGURE 1 are fixed stops to determine the maximum amount of forward travel and the remainder shown at 23b (FIG. 1) are solenoid stops which are selectable by means to be described for varying the extent of forward travel as required.

In operation of these stops they strike a cross bar 24 of a shock absorbing or cushioning device.

This device is shown more clearly in plan in FIGURE 9 from which it will be seen that the cross bar 24 is mounted by bushes 25 to have guided movement on spaced guide rods 26, the latter being carried by a part 27 of the base frame 1, and springs 26a being provided on the rods 26. The frame part 27 at its front end has pivotally connected to it a hydraulic shock absorber 28 the other end of which is fixed to the cross bar 24, as seen in FIGURE 3. The travel carriage 3 which is indicated in broken lines also carries an adjustable stop 29 which is carried forward with the travel carriage 3 and which serves to return cross bar 24 to its original position as the carriage completes a return movement. In addition there is a pair of travel limit electrical contacts T one carried by the cross bar 24 and the other carried by the frame 27, and a pair of travel cushioning electrical contacts TC one on the cross bar 24 and the other on the frame 27, and a still further pair of electrical travel return cushioning contacts TRC one on the cross bar 24 and the other on the frame 27.

From the above it will be seen that the forward travel of the travel carriage 3 is controlled by a stop 23a or 23b striking the cross bar 24 by which the shock absorber 28 is contracted.

In addition as shown in FIGURE 6, there is a shock absorbing device for the return travel of the travel carriage 3. In this device there is a cross bar 30 having bushes 31 riding on spaced guide rods 32 the latter being mounted in a base frame part 33 and there being springs represented at 33a connected between the cross bar 30 and the frame 33; a hydraulic shock absorber 34 is connected at one end to the base frame 1 and at the other end to said cross bar 30. In addition the travel carriage 3 carries a stop 35 and a spring 36 the arrangement being such that after forward travel of the travel carriage 3 it returns and the stop and spring 35, 36 strike the cross bar 30 thereby to contract the shock absorber 34. There is also provided travel return electrical contacts TR one on the frame part 33 and the other on the cross bar 30, and raise safety electrical contacts RS one on the travel carriage 3 and the other on the base frame 1.

Dealing now with the raise and return of the raise carriage 5, this is accomplished by a pneumatic actuator cylinder and ram indicated at 36' (FIGURE 1) which is connected at one end by a connection 37 to the travel carriage 3 and at the other end by a connection 38 to one end of a chain 39 which is guided over a guide wheel 40 carried by the travel carriage 3 and which at its other end is connected by a connection 39a to the raise carriage 5. For controlling the extent of raising movement of this raise carriage 5 there is provided on the travel carriage 3 a plurality of rails 41 forming between them slots 42 in which there is secured upper end fixed stops 43 and lower end stops 44 (FIGS. 3 and 7) for resetting a shock absorber 50 and actuating a shock absorber 49 (both shock absorbers being referred to hereinafter in greater detail) and a plurality of spaced solenoid stops 45. The lower limit of the raise return movement is provided by raise return contacts RR (FIG. 3) when closed. In addition it is to be noted that associated with the pneumatic raise actuator 36 there is a raise return solenoid lock valve RLV to be hereinafter referred to and operation of which is necessary for controlling starting operations of the machine by an initial lowering of the head plate 10 in a manner to be hereinafter described.

End movements of the raise carriage 5 are controlled through the medium of a striker plate 46 which has bushes 47 on guide rods 48, the latter, as more clearly shown in FIGURE 7 being connected to the raise carriage 5. One end of each of the two shock absorbers 49, 50 is connected by connections 51, 52 to the striker plate 46 and the other end is connected by connections 53, 54 to the raise carriage 5. It will be seen that upon the striker plate 46 striking one of the stops 43, 44 or 45, the shock absorbers 49 and 50 will be operated in opposite directions.

As shown in FIGURE 3 there is also associated with the raise and return, part raise electrical contacts RPT, one on the raise carriage 5 and the other on the travel carriage 3, travel safety electrical contacts TS, one on the raise carriage 5 and the other on the travel carriage 3, raise return cushion electrical contacts RRC, one on the raise carriage 5 and one on the striker 46, raise limit electrical contacts R, one on the raise carriage 5 and the other on the striker 46 and raise return contacts RR, one on the travel carriage 3 and one on the raise carriage 5.

Referring now to the cross and return with particular reference to FIGURES 4 and 5, this is effected by a pair of interconnected pneumatic cross actuators 55, 56. More specifically one end of the cross actuator 55 is connected by a connection 57 to the cross carriage 7 and the other end is connected by a connection 58 to a chain 59 which is guided on end sprocket wheels 60, 61 and the other end of which is connected by connection 62 to one end of the cross actuator 56, the other end of which is connected by a connection 63 to the raise carriage 5.

As will be seen more clearly from FIGURE 6 the extent of movement of the cross carriage 7 is controlled by stops such as a fixed end stop 64 and solenoid stops 65 which are mounted in slots 66 formed by rails 67 on the raise carriage 5. In this instance there are two spaced striker plates 68, 69, one of which is operative in one direction and the other of which is operative in the other direction, and these striker plates are associated with a shock absorbing device shown more clearly in FIGURE 8. The striker plates 68 and 69 are mounted by bushes 70 on a pair of guide rods such as 71 which are carried by the cross carriage 7. The cross carriage 7 has projecting end brackets 72, 73 and there is a pair of hydraulic shock absorbers 74, 75 one end of each of which is connected to the brackets 72, 73 respectively and the other ends of which are connected to the striker 68, 69. Consequently as these strikers 68, 69 strike the stops 64 or 65 the shock absorbers 74, 75 will be operated in opposite directions. In addition there is a pair of cross limit electrical contacts C, one on the cross carriage 7 and the other on the striker 68, and a pair of cross return electrical contacts CR, one on the striker 69 and the other on the carriage 7.

Dealing now with rotation, the aforesaid bearing 14, FIGURES 1 and 3, is provided by a bush carried by the cross carriage 7, and by a spindle 76 extending through the bush and carrying at its lower end the rotating table 13. For effecting rotational movement there is a pneumatic rotation actuator 77, one end of which (as seen in FIGURE 5) is connected by a connection 78 to the cross carriage 7 and the other end of which is connected by a connection at 79 to the rotating plate 13. In association with the rotation (FIGURES 1 and 3) there is a pair of rotate limit electrical contacts RO, RO1, one on the table 13 and the other carried by the cross carriage 7, and there is a rotate return electrical contact ROR also on the plate 13 at a position displaced through 90° from the contact RO on the plate, each of these contacts RO and ROR on the plate 13 making contact with the contact RO1 on the cross carriage 7 in turn, as will be hereinafter referred to more fully.

For obtaining creep, i.e., a slow lowering of the head plate 10, the said spindle 76 has connected to it at its upper end by a connection 80 (FIGURE 5) one end of a lever 81 which is pivoted at 82 and has its other end connected to one end of a pneumatic creep actuator 83 the other end of which is connected to a bracket 84.

For obtaining tilt of the head plate 10 about a horizontal axis of the carrier there is a pneumatic tilt actuator 85 (also FIGURE 3), one end of which is connected by a connection 86 to the rotating plate 13 and the other end of which is connected by a connection 87 to the frame part 11.

For obtaining twist or tilt of the head plate 10 about the longitudinal axis 10a, there is a pneumatic twist actuator 88 (FIG. 3), one end of which is connected by a connection 89 to the frame part 11 and the other end of which is connected by a connection 90 to the head plate 10.

Also associated with the twist movement there is a pair of twist limit contacts TW, one of which is on the plate 10 and the other which is on the frame 11, and there is a pair of twist return contacts TWR, one of which is on the head plate 10 and the other of which is on a bracket projecting from the frame 11, to be more fully referred to hereinafter.

In addition there is provided, substantially in line with the head plate 10, a conveyor, in this instance suitable for conveying bricks up to the machine.

That end of the conveyor nearest to the machine is shown in FIGURE 2 from which will be seen that there is an endless roller conveyor indicated at 91, the upper lap of which runs in a channel 92 of sufficient width in this instance for two bricks B side by side. The motor indicated at M for driving the conveyor is connected by motion transmitting mechanism to the conveyor drum 93 through the intermediary of a feed clutch FC. A frame support 95 for the conveyor has a forward extension 96 which carries a feed stop 97 at its most forward end.

More specifically the feed stop 97 is connected by a lever 98 to a free frame 99 and is pivoted to the fixed frame at 100, and it is also connected by a link 101 to the fixed frame 96. The free frame 99 is connected by a feed stop actuator 102 to the fixed frame 96 such that upon operation of the actuator the free frame 99 is displaced and through the lever 98 and link 101 causes displacement of the feed stop 97 between the upper position shown where it acts as a stop for the forwardly travelling bricks, and a lower inoperative position clear of the bricks.

The aforesaid head plate 10 is indicated in broken lines and by suction means hereinafter to be described it is caused to pick up eight bricks B, i.e., two rows of bricks with four in each row. At the time of being picked up these two rows of bricks are resting on a series of rollers 103 which are carried in groups by support units 104, 105, 106 and 107. The support 107 nearest the conveyor 91 is fixed but the other three support units 104, 105 and 106 are upwardly and downwardly displaceable similarly to the feed stop 97. More specifically the most forward unit 104 is connected by a lever 108 to a lower spring 109 and is pivoted at 110 to the fixed frame 96, and it is further connected by a link 111 to this fixed frame 96. The intermediate unit 105 is connected by a lever 112 to a lower spring 113 and it is pivoted at 114 to the fixed frame 96, and it is further connected by a link 115 to this fixed frame 96. The rearmost movable unit 106 is connected by a lever 116 to a lower spring 117 and is pivoted at 118 to the fixed frame 96 and it is also connected by a link 119 to this fixed frame 96. There is a further connection 120 from fixed frame 96 to the free frame 99 to complete a parallelogramic arrangement. At one side i.e. the opposite side that shown in FIGURE 2 the free frame 99 is provided with three spaced solenoid stops 121, 122 and 123 at such spaced locations that they are in registry with the forward edges of the levers at said side which correspond to the levers 108, 112 and 116. The purpose of this arrangement is that the stops 121, 122 and 123 being of solenoid type can be selectively operated and if for example the stop 121 is rendered operable each time the feed stop 97 is lowered clear of the bricks, this will cause the forward unit 104 to be lowered such that the two bricks at the forward position will not be picked up by the head plate 10. Similarly if the stop 122 is rendered operative this will cause the two units 104 and 105 to be lowered with the feed stop 97 and the most forward four bricks will not be picked up by the head plate 10. Still further if the stop 123 is rendered operative this will cause the rearmost unit 106 to be lowered together with the other two units 105 and 104 by the lowering of the feed stop 97 such that none of the foremost six bricks will be picked up by the head plate 10. It will be noted that when the stop 123 is used it is not necessary to use stops 121 and 122 and when stop 122 is used it is not necessary to use the stop 121.

Alternatively a selection of the bricks to be picked up by the head plate 10 can be accomplished by a selected control of the suction in respect of the different bricks.

The said head plate 10 is shown in longitudinal sectional detail in FIGURE 10 from which it will be seen that there is a tray like frame 10a which is divided into eight compartments by partitions such as that shown at 10b, and for each compartment there is a lower rectangular opening such as those shown at 10c in each of which there is accommodated a plate such as shown at 10d having around its periphery and underside a frame-like arrangement of resilient material such as sponge rubber and indicated at 10e. Interiorly of each compartment the plate 10d has a peripheral flange 10f for retention of the plates 10d in position, and each plate 10d has a central orifice 10g with which there communicates a pipe line 10h connected to a pneumatic circuit. In addition in each compartment there is a pair of leaf springs such as 10i the bowed parts of which bear on the plate 10d and the ends of which are positioned under inturned flanges such as 10j of the tray frame 10a. Consequently when the head plate is brought down into engagement with the bricks the resilient under frame parts 10e together with te springs 10i allow for resilient engagement of the plate with the bricks, also for effective sealing of the interior of the frame parts 10e; and for accommodating bricks of slightly varying heights, such that upon the application of vacuum or suction in the pipe line 10h, the head plate can pick up the bricks.

The said pneumatic circuit is illustrated in FIGURE 11 which shows that the circuit includes the aforesaid actuators i.e. the raise actuator 36′, the cross actuators 55, 56, and travel actuator 15, the rotate actuator 77, the creep actuator 83, and the tilt and twist actuators 85 and 88. These actuators are arranged in the circuit as illustrated, together with various solenoid operated valves of which the aforesaid raise and return solenoid lock valve RLV is shown associated with the raise actuator 36′. In addition associated with this actuator there is a raise solenoid valve RSV.

In association with the cross actuators 55 and 56 there is a cross solenoid valve CV one to each actuator, associated with the travel actuator 15 there is a pair of travel solenoid valves TSV in parallel, associated with the creep actuator there is a creep solenoid valve CSV associated with the rotate actuator 77 there is a rotate solenoid valve ROSV, associated with the tilt actuator there is a tile solenoid valve TISV, and associated with the twist actuator there is a twist solenoid valve TWSV.

Referring back to FIGURE 11 it will be seen that the solenoid valves RSV and TSV for travel and return have associated with them cushioning valves indicated at RRCV TCV and TCV1 and needle valves indicated generally at VA for cushioning purposes.

Reverting back to the cushioning arrangement at the end of the travel return and raise return movements, the cushioning contacts TRC and RRC are open and these cause closing of the exhaust side of the associated actuator via the cushioning solenoid valves TCV, TCV1 and RRC respectively allowing exhaust to atmosphere only through the preset needle valves VA associated therewith. Simultaneously or in sequence a hydraulic ram is caused to pump oil either into a reservoir or in a closed loop via a preset needle valve. In the instance of the raise and raise return movement the two cylinders of the shock absorbing device are connected in a closed loop; in the instance of the travel and return shock absorbing devices, the cylinders are connected to reservoirs as indicated in FIGURE 6 at 34a. It is noted that cushioning for the raise, cross and cross return is by the hydraulic shock absorbers only without air cushioning.

The various solenoid valves referred to are operated by a controller in the form of a system of electrical relays with the assistance when required of a programer.

It is to be understood that the apparatus is by no means restricted to the picking up from a conveyor belt and placing on a platform. It can equally be used for moving bricks from a pack of bricks and placing them in another location i.e. back on a conveyor belt, or on shelves in a kiln or any other desired place, under control of a suitable programing arrangement.

As far as the brick industry is concerned another modification is the use of a carrier or head with a suitable number of compartments to pick up as many as say sixteen bricks or more at a time. Obviously, the use of such a head considerably speeds up formation of a pack, the required placing of the bricks in the pack being obtained by correct spacing of the compartments in the pick-up head.

Although the invention has been described with specific reference to a machine for stacking bricks, it is to be understood that although it has particular utility in this field, there are many other fields in which a machine based on the same principles can be used. In fact in broad terms it can be said that the machine of the invention can be usefully applied to any operation in which it is desired to pick up articles or to otherwise acquire them at one location and discharge them at another location usually in some pre-arranged fashion.

What I claim is:

1. Apparatus for mechanically handling bricks including the acquisition, conveyance and release of a predetermined number thereof, comprising vacuum head means including a plate support for effecting acquisition of a selective number of bricks, carrier means carrying said plate support for effecting control over the disposition of said vacuum head means, structural means supporting said carrier means for displacement in at least three diverse mutually perpendicular directions to limited extents, means including operations control means for selectively effecting said displacement of said structural means under control of said operations control means including changes of disposition at times between the acquisition and release of the bricks, said carrier means including support means mounted on said structural means for rotation about a vertical axis of said carrier means and a frame member hinged at one end thereof to said support means for pivoting about a first horizontal axis of said carrier means, said plate support being hinged to the other end of said frame member for pivoting about a second horizontal axis parallel to said first horizontal axis, first actuating means interconnecting said support means and said frame member for effecting tilting of said frame member about said first horizontal axis, second actuating means interconnecting said frame member and said head plate means for effecting tilting of said head plate means about said second horizontal axis, and drive means interconnecting said carrier means and said structural means for effecting rotation of said carrier means about said vertical axis.

2. An apparatus as defined in claim 1 wherein said vacuum head means further includes a plurality of vacuum units mounted on said support plate in a single plane and valve control means associated with each vacuum unit capable of rendering selective ones of said units operative for effecting acquisition and release of the bricks in a predetermined array.

3. An apparatus as defined in claim 2 wherein said vacuum units are spring loaded to said support plate and are provided with a resilient frame-like arrangement for direct contact with the bricks to be acquired.

References Cited by the Examiner

UNITED STATES PATENTS

| | | |
|---|---|---|
| 2,476,249 | 7/1949 | Payne. |
| 2,679,940 | 1/1954 | Goertz. |
| 2,959,301 | 11/1960 | Willsea. |
| 2,995,717 | 10/1960 | Segur. |
| 3,007,097 | 10/1961 | Shelley et al. |
| 3,033,059 | 5/1962 | Melton et al. |

OTHER REFERENCES

German printed application, 1,080,457, 4–21–1960.

GERALD M. FORLENZA, *Primary Examiner.*

HUGO O. SCHULZ, MORRIS TEMIN, *Examiners.*

ERNEST A. FALLER, D. MARTENS, M. WOLSON, A GRANT, *Assistant Examiners.*